United States Patent Office 2,875,166
Patented Feb. 24, 1959

2,875,166
METHOD OF THICKENING AQUEOUS DISPERSIONS WITH A DIVALENT METAL ACRYLATE AND PRODUCT THEREOF

Robert P. Hopkins, Ardsley, Pa., assignor to Rohm & Haas Company, Philadelphia, Pa., a corporation of Delaware No Drawing. Application September 20, 1954
Serial No. 457,293

7 Claims. (Cl. 260—29.6)

This invention relates to improved thickened compositions and to methods of thickening aqueous dispersions, such as solutions, emulsions, or suspensions in aqueous media, by the in situ polymerization of an acrylate of calcium of magnesium.

It is already known to use thickening agents of polymeric type such as hydroxyethyl cellulose, methyl cellulose, carboxymethyl cellulose, sodium polyacrylate, and water-soluble natural gums such as gum tragacanth. The addition of such substances in dry solid form to the dispersions to be thickened requires extreme care in order to avoid the production of gels which render the dispersions unsuitable for use. It is, therefore, customary to dissolve the water-soluble thickening agent in water to provide a dilute solution of about 10% concentration which is then added to the dispersion to be thickened with suitable agitation. Such prior water-soluble thickening agents are generally made in various viscosity grades in order to enable one to produce a wide range of viscosities in the dispersions.

Polyacrylates of polyvalent metals such as calcium, magnesium, zinc, barium, and strontium are of water-insoluble character and cannot be added to aqueous dispersions for the purpose of thickening such dispersions. However, it has now been discovered that, in spite of the water-insoluble character of these polyacrylates, aqueous dispersions can be thickened by such materials when their monomers are polymerized in situ in the aqueous dispersions to be thickened.

In general, the invention provides a procedure of thickening an aqueous dispersion in accordance with which a water-soluble divalent metal acrylate monomer, that is calcium acrylate, magnesium acrylate, strontium acrylate, zinc acrylate or barium acrylate is added with a polymerization initiator or catalyst system and thereafter polymerized in situ to effect the desired thickening. The process, therefore, provides a system by which an easily-soluble monomeric thickening composition can be added directly to the aqueous dispersion without encountering serious difficulties because of gel formation. In addition, a single composition may be added to provide a complete range of viscosities from the highest to the lowest, and it is unnecessary to provide numerous compositions for obtaining different viscosities in the final dispersion.

With the monomeric divalent metal acrylate, a material for initiating polymerization is included. Such initiator may be of the free radical type such as acetyl peroxide, tert-butyl hydroperoxide or one of the persulfates such as ammonium, potassium, or sodium persulfate used in an amount of about ½ to 20% by weight based on the weight of the monomer. A redox system may be used in which one of the persulfate initiators just mentioned is used in conjunction with an accelerator in the form of a reducing agent such as sodium thiosulfate or sodium hydrosulfite. Other reducing agents included water-soluble metabisulfites, such as of ammonium, sodium or potassium, and the salts, such as the sulfites of metals which are capable of existing in more than one valence state such as cobalt, iron, nickel and copper. The amount of accelerator, when used, may be from ½ to 20% by weight based on the weight of the monomer. Generally, the accelerator is used in approximately the same amount as the initiator. For most purposes, an amount of about 8 to 12% by weight of initiator and of 8 to 12% by weight of the accelerator (both based on monomer weight) is preferred since such proportions are adequate to provide a wide range of viscosities in the final thickened dispersion by controlling conditions in the manner that will be more fully discussed hereinafter. In addition, promoters such as copper, iron or lead salts may be used in small amounts to promote the action of the persulfate catalysts. The use of such salts is optional and depends upon whether the application of the aqueous dispersion to be thickened will be affected favorably or deleteriously by the presence of such salts. When used, the salts may be in amounts of 0.1 to 0.3% by weight based on the weight of the monomer.

By the terms "catalyst" and "catalyst system," it is meant to include any or all of the materials hereinbefore referred to as initiators, accelerators, or promoters.

The divalent metal acrylate may be added to the dispersion to be thickened either before or after the addition of the polymerization catalyst as defined hereinabove. Alternatively, the dry monomer may be mixed with the dry catalyst in proper proportions and the mixture stored and/or shipped as such. Such a pre-catalyzed monomer serves as a thickening composition which can be added in the proportion needed to produce the necessary increase in viscosity of the aqueous dispersion to which it is added.

The dispersions to be thickened must not contain components which are flocculated or precipitated by the divalent metal acrylates. This requires the use of non-ionic emulsifying or dispersing agents exclusively when such agents are needed. When a component is to be used that is sensitive to the divalent metal acrylate, it should be withheld till after the polymerization of the acrylate in the dispersion has been effected. Upon addition at this time, the component has a negligible tendency to throw out the polyacrylate.

The thickening action obtained by the addition of the polymerizable monomer and the catalyst depends upon the various conditions that can readily be controlled. Among these conditions are: (1) the relative proportion of catalyst and monomer, (2) the type of catalyst, (3) the proportion of monomer introduced into the dispersion to be thickened, and (4) the temperature. The latter factor, namely the temperature, not only influences the final viscosity but it determines the rate at which the final viscosity is obtained.

The proportion in which the acrylate monomer may be added to the aqueous dispersion may vary from about 1 to 10% by weight based on the total weight of the dispersion to be thickened. In general, however, the amount used should not be over ¼ of the total solids in the dispersion prior to the addition of the thickening composition. As stated before, greater viscosities may be obtained in proportion to the greater amount of thickening composition added to the dispersion. Use of amounts appreciably greater than 10% generally cause gel formation.

After the thickening composition has been added to the dispersion and the two have been mixed by suitable agitation or stirring, the composition is allowed to stand for the time necessary to develop the desired viscosity. The time may be shortened by increasing the temperature up to about 85° C. On the other hand, if the thickened dispersion is not immediately needed, it may be allowed to stand at low temperatures for whatever time is available before it is needed. If adequate time is available, the mixture may be allowed to stand at room temperature or even at a temperature below room temperature until polymerization is completed and the ultimate viscosity is obtained. After the ultimate increase in viscosity is obtained by the completion of polymerization, the composition may be put to use immediately or at any suitable time thereafter as may be convenient. It may be cooled before use if elevated temperatures are used to effect polymerization, or it may be used at any elevated temperature including one which is the same or higher than that of polymerization. If desired, agitation may be provided during polymerization or it may be used during use or only for short periods during, before, or after the polymerization in the mixture.

The dispersions thickened by the composition of the present invention may be used for coating, impregnating, cementing, laminating, especially for making plywood, safety glass and the like, molding, casting, for sizing, dressing or finishing of paper, textiles, leather, felts, and the like. The aqueous dispersions to be thickened may contain all sorts of substances such as resinous or elastomeric binders. For example, thermoplastic resins obtained by emulsifying and then copolymerizing with the aid of a catalyst a mixture of one or more monoethylenically unsaturated copolymerizable monomers such as N-dialkyl acrylamides, e. g., N-dimethyl, -diethyl, -dipropyl, -dibutyl, -diamyl, -dihexyl, and -dioctyl acrylamides; the acrylic, alpha-alkyl acrylic and alpha-haloacrylic esters of saturated monohydric alcohols, especially of saturated aliphatic monohydric alcohols, e. g., the methyl, ethyl, propyl, isopropyl, butyl, isobutyl, and amyl esters of acrylic, methacrylic, ethacrylic, propacrylic, chloroacrylic, bromoacrylic acids; the phenyl, benzyl, and phenylethyl esters of the aforementioned acids; vinyl aromatic compounds, e. g., styrene, alphamethyl styrene, dimethylstyrenes, dichlorostyrenes, the various cyanostyrenes, the various methoxystyrenes, vinyl naphthalenes, e. g., 4-chloro-1-vinyl-naphthalene; vinyl and vinylidene halides, e. g., vinyl and vinylidene chlorides, bromides, etc.; alkyl vinyl ketones, e. g., methyl vinyl ketone, ethyl vinyl ketone, methyl isopropenyl ketone, etc.; itaconic diesters containing a single $CH_2=C<$ grouping, e. g., the dimethyl, diethyl, dipropyl, dibutyl and other saturated aliphatic monohydric alcohol diesters of itaconic acid, diphenyl itaconate, dibenzyl itaconate, dibenzyl itaconate, di-(phenylethyl) itaconate; vinyl, allyl and methallyl esters of saturated aliphatic monocarboxylic acids, e. g., vinyl, allyl and methallyl acetates, vinyl, allyl and methallyl propionates, vinyl, allyl and methallyl valerates; vinyl thiophene, 4-vinyl pyridine; vinyl pyrrole; nitriles containing a single $CH_2=C<$ grouping, e. g., acrylonitrile, methacrylonitrile, etc. Copolymerization by addition to the $C=C$ groups may be assisted by means of a peroxy catalyst, such as hydrogen peroxide or ammonium persulfate. The emulsion and polymerization may be assisted by a non-ionic emulsifying agent that serves also to stabilize the dispersion of the copolymer after completion of the copolymerization. The comonomers selected and the proportions thereof should be such as to produce a water-insoluble linear copolymer. The molecular weight of the copolymers may range from 10,000 to as high as 4,000,000. Particularly valuable resin dispersions are obtained by the polymerization in an emulsion system of one or more monomeric esters of acrylic and/or methacrylic acid in which the alkyl group contains one to eight carbon atoms such as methyl, ethyl, n-propyl, isopropyl, n-butyl, isobutyl, sec-butyl, tert-butyl, isoamyl, tert-amyl, hexyl, heptyl, n-octyl, 2-ethylhexyl. The polymerizable emulsions can be prepared at temperatures from 0° C. to about 100° C., but intermediate temperatures are much preferred. Thus, with the acrylic esters in which the alkyl group contains one to four carbon atoms a temperature from about 10° C. to about 60° C. is employed whereas a higher temperature; e. g., 30° C. to 80° C., is recommended when esters containing five to eight carbon atoms in the alkyl group are copolymerized. Peroxidic free-radical catalysts, particularly catalytic systems of the redox type mentioned above, are recommended. The most convenient method of preparing the dispersions of copolymers comprises agitating an aqueous suspension or emulsion of a mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical and hence preferred, to produce dispersions which contain about 30%–50% resin-solids. When resin dispersions of this type are to be thickened, there may be adequate catalyst in the dispersion to polymerize the divalent metal acrylate in which event no additional catalyst need be added.

Clay pigments may be present, if the dispersion is to be used for coating paper. The ratio of the pigment to the binder is preferably within the range of 8:1 to 1:1 by weight but may be higher or lower, if desired, especially to produce novelty effects, such as for embossing. The pigment may be dispersed in the aqueous emulsion with a non-ionic dispersing agent before polymerization to form the dispersion that is subsequently to be thickened, but is preferably dispersed into the aqueous polymer dispersion after completion of such polymerization. The divalent metal acrylate is introduced after such polymerization and is polymerized to thicken the dispersion to the desired extent. The composition may then be applied to the paper in any suitable equipment, such as by rolls, particularly printing rolls, when localized coating is desired. Stencilling or any other system of application may also be resorted to.

The thickening compositions may also be applied to dispersions of elastomeric substances such as natural and artificial latices of natural rubber or synthetic elastomers such as the polymers and copolymers of dienes, including copolymers of butadiene with styrene, acrylonitrile and the like. The compositions may also be used for thickening dispersions of rubber derivatives such as chlorinated rubber, rubber hydrochloride and so on. In all such dispersions, any dispersing agent present must be of non-ionic type.

Aqueous dispersions of thermosetting substances, such as phenol-formaldehyde condensates or those of aminoplast type, including the lower molecular weight condensation polymers (which may be of such size as to prevent diffusion into cellulose but are still water-dispersible, including those in acid colloid form) or monomeric reaction products of an aldehyde, such as formaldehyde, with urea, thiourea, biuret, or other homologues or derivatives thereof, such as N,N-ethyleneurea, N,N'-ethyleneurea, N,N'-dimethylurea, N,N'-diethylurea, N,N'-dimethoxymethylurea, N,N'-dimethoxymethylurea, N,N'-diethoxyethylurea, tetramethoxymethylurea, tetraethoxyethylurea. Similar reaction products of formaldehyde with triazines, such as melamine may also be employed, such as N,N-dimethylmelamine and alcohol-modified melamine-formaldehyde thermosetting resin condensates; e. g., of methyl and ethyl alcohols, for example, dimethoxymethylmonomethylolmelamine. Similar reaction products of formaldehyde with mixtures of triazines with urea, biuret or other derivatives of urea may be used. Alternatively, diisocyanates, such as menthane diisocyanate and diepoxides, such as

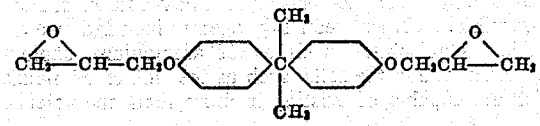

are useful. Similarly, reaction products of formaldehyde with alkyl, alkylene, aralkyl, cycloalkyl, or aryl substitution products of biguanide including those, such as ethylene dibiguanide, in which more than one biguanide radical is attached to a single organic residue. Such substituted biguanides can be obtained by the action of dicyandiamide on the hydrochloride of the appropriate alkyl-, aralkyl-, cyclo-alkyl- or aryl-amine. Primary or secondary amines can be used. Thus mono-biguanides can be obtained from dicyandiamide and ethylamine, diethylamine, hydroxyethylamine, propylamine, butylamine, 2-hydroxy-propylamine, benzylamine, aniline, toluidines, and methoxy-anilines, and dibiguanides from ethylene-diamine, alpha-beta diamino-propane, trimethylene diamine, and hexamethylene diamine and other alkylene diamines. The reaction between dicyandiamide and an amine hydrochloride is conveniently effected by heating at temperatures of the order of 150°–200° C.

The dispersion may contain compatible dyes, pigments, fillers or extenders either with or without the above binders of thermoplastic, elastomeric or thermosetting resinous or resin forming character. The dispersion may also contain dispersing agents of non-ionic type. Such dispersing agents may be present as a result of the preparation of the aqueous dispersion that is later to be thickened by the composition of the present invention or it may be added at the same time or shortly after or before the addition of the thickening composition of the present invention. Among the dispersing agents that may thus be present are alkylphenoxypolyethoxyethanols having alkyl groups of about seven to eighteen carbon atoms and 6 to 60 or more oxyethylene units, such as heptyl-phenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives or etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

The following examples in which the parts are by weight and all viscosity measurements are determined at 25° C. are illustrative of the invention:

*Example 1*

To 50 parts of a dispersion obtained by the emulsion copolymerization of 90 parts by weight of ethyl acrylate and 10 parts by weight of acrylonitrile in the presence of a non-ionic dispersing agent, namely an ethylene oxide condensation product of an octylphenol having an average of about 40 ethylene oxide units per molecule (the polymer dispersion containing about 28% by weight of the copolymer), 0.4 part by weight of calcium acrylate, 0.04 part of ammonium persulfate, and 0.04 part by weight of sodium thiosulfate were added. After mixing the ingredients thoroughly, the dispersion was held for one hour at 80° C. and attained a viscosity of 100 centipoises. The dispersion was then coated on chipboard and dried.

*Example 2*

The procedure of Example 1 was followed except the proportion of calcium acrylate, ammonium persulfate and sodium thiosulfate were doubled. After one hour of standing at 80° C. the dispersion had a viscosity of 1320 centipoises, thus showing the wide range of viscosity that may be obtained by varying the proportions of the thickening composition. The resulting composition was applied to a warp of cellulose acetate yarns in a slasher to prepare the yarns for weaving.

*Example 3*

The procedure of Example 1 was followed in preparing a thickened dispersion except that the amount of calcium acrylate, ammonium persulfate and sodium thiosulfate were quadrupled. The dispersion attained a viscosity of 3850 centipoises after standing at 80° C. for 20 minutes. It was then coated on a felt. Because of the high viscosity, the coating showed little penetration into the left matrix but adhered strongly to the surface thereof.

*Example 4*

To 50 parts of an aqueous dispersion containing 45% by weight of a copolymer of about 66 parts of ethyl acrylate, about 33 parts of methyl methacrylate, and about 1 part of methacrylic acid containing a non-ionic dispersing agent of the type described in Example 1, 4.5 parts by weight of calcium acrylate, 0.06 part of ammonium persulfate, and 0.06 part of sodium thiosulfate were added and mixed into the dispersion thoroughly. After standing 30 minutes at 25° C., a pronounced increase in viscosity was attained and the dispersion was coated on a printed bookcover to provide a clear top coat thereon.

*Example 5*

To 50 parts by weight of an aqueous dispersion of polyvinyl acetate containing 55% of the polymer and about 1% of a non-ionic dispersing agent of the type in Example 1, about 2.8 parts of calcium acrylate, 0.3 part of ammonium persulfate and 0.3 part of sodium thiosulfate were added and stirred in thoroughly. After standing 45 minutes at 60° C., there was a pronounced increase in viscosity to produce a smooth, creamy mix which was applied to a decorated paper such as is used in making postcards to produce a clear top coat thereon.

*Example 6*

To 100 parts of an aqueous dispersion containing 50% by weight of urea-formaldehyde pre-condensate carried to a condition of polmerization wherein it is still water-dispersible, 4.3 parts of calcium acrylate, 0.4 part of ammonium persulfate and 0.4 part of sodium thiosulfate were added. The dispersion which had an initial viscosity of 2 poises acquired a viscosity of 21.5 poises after standing at room temperature. The thickening dispersion was coated on wood sheets which were subsequently pressed and baked in a customary fashion for producing plywood.

*Example 7*

To 100 parts by weight of a dry pulverized pre-condensate or urea-formaldehyde which was condensed to a condition where it is still water-dispersible, 4.6 parts of calcium acrylate, 54 parts of water, 0.46 part of ammonium persulfate and 0.46 part of sodium thiosulfate were added. The initial dispersion after thorough mixing had a viscosity of about 10 poises at 25° C. and after standing at room temperature for about 45 minutes it attained a viscosity of 61 poises at 25° C. The thickened dispersion was then applied to wood sheets which were formed into plywood as in Example 6.

*Example 8*

A dry composition containing calcium acrylate and 10% by weight (based on the weight of calcium acrylate) of ammonium persulfate and 10% (based on the weight of calcium acrylate) of sodium thiosulfate was prepared and thoroughly mixed in dry pulverized condition. To 100 parts by weight of an aqueous dispersion containing about 65% by weight of a urea-formaldehyde pre-condensate, 3.6 parts by weight of the mixed calcium acrylate-catalyst composition was added. The resulting mixture after stirring exhibited a viscosity of 12.5 poises, but after standing at room temperature (about 25° C.) for 20 minutes, it reached a viscosity of 62 poises. The thickened dispersion was then applied to wood sheets from which plywood was made as in Examples 6 and 7.

*Example 9*

The procedure of Example 1 was followed except that the calcium acrylate was replaced by the same amount of magnesium acrylate. Similar viscosity increase was attained.

*Example 10*

The procedure of Example 8 was followed except that the calcium acrylate was replaced by the same proportion of magnesium acrylate. The thickened urea-formaldehyde composition was similarly applied to wood sheets and formed an excellent adhesive in the manufacture of plywood therefrom.

The thickening agent compositions of the present invention comprising the pre-catalyzed divalent metal acrylates, such as calcium or magnesium acrylate, or mixture thereof have the advantage of being readily water-soluble so that they can be shipped or stored in dry condition and added directly to the dispersions to be thickened without requiring extreme care to avoid the formation of gels. Their use avoids the necessity of preparing solutions of the thickening agent before it is added to the dispersion to be thickened as in previous practices. Furthermore, a single thickening agent can be produced and sold as such and used to produce a wide range of viscosities simply by controlling the amount added or the temperature of polymerization in the dispersion to be thickened. It is, therefore unnecessary to provide a multiplicity of thickening agents of different viscosity characteristics.

It is to be understood that changes and variations may be made without departing from the spirit and scope of the invention as defined in the appended claims.

I claim:

1. The method of thickening an aqueous dispersion containing a non-ionic dispersing agent comprising adding thereto 1% to 10% by weight, based on the weight of the dispersion, of a water-soluble divalent metal acrylate and a peroxy polymerization catalyst and allowing the acrylate to polymerize in situ at a temperature from below room temperature to about 100° C. to thereby thicken the dispersion.

2. The method of thickening an aqueous dispersion containing a non-ionic dispersing agent and a substance selected from the group consisting of thermoplastic resins and thermosetting condensates, comprising adding thereto from 1% to 10% by weight, based on the total weight of the dispersion, of an acrylate selected from the group consisting of calcium acrylate, magnesium acrylate, zinc acrylate, barium acrylate, and strontium acrylate and a peroxy polymerization catalyst and allowing the acrylate to polymerize in situ at a temperature from below room temperature to about 100° C. to thereby thicken the dispersion.

3. The method of thickening an aqueous dispersion containing a non-ionic dispersing agent and a substance selected from the group consisting of thermoplastic resins and thermosetting condensates, comprising adding thereto 1% to 10% by weight, based on the weight of the dispersion, of calcium acrylate and a peroxy polymerization catalyst and allowing the acrylate to polymerize in situ at a temperature from below room temperature to about 100° C. to thereby thicken the dispersion.

4. The method of thickening an aqueous dispersion containing a non-ionic dispersing agent and a substance selected from the group consisting of thermoplastic resins and thermosetting condensates, comprising adding thereto 1% to 10% by weight, based on the weight of the dispersion, of magnesium acrylate and a peroxy polymerization catalyst and allowing the acrylate to polymerize in situ at a temperature from below room temperature to about 100° C. to thereby thicken the dispersion.

5. As a new composition of matter, an aqueous dispersion containing a substance selected from the group consisting of thermoplastic resins and thermosetting condensates dispersed therein, a non-ionic dispersing agent, and, as a thickener, a water-soluble divalent metal acrylate polymerized in situ by a peroxy polymerization catalyst, the proportion of polymerized acrylate being from 1% to 10% by weight of the rest of the dispersion.

6. A composition as defined in claim 5 in which the acrylate is calcium acrylate.

7. A composition as defined in claim 5 in which the acrylate is magnesium acrylate.

References Cited in the file of this patent

UNITED STATES PATENTS

| | | |
|---|---|---|
| 1,976,679 | Fikentscher et al. | Oct. 9, 1934 |
| 2,401,348 | Hauser et al. | June 4, 1946 |
| 2,651,619 | De Mello et al. | Sept. 8, 1953 |